United States Patent [19]

Scott et al.

[11] Patent Number: 5,081,612
[45] Date of Patent: Jan. 14, 1992

[54] METHODS FOR ESTIMATING THE BURIAL CONDITIONS OF SEDIMENTARY MATERIAL

[75] Inventors: David R. Scott, London, England; Leon A. Thomsen, Tulsa, Okla.

[73] Assignee: Amoco Corporation, Chicago, Ill.

[21] Appl. No.: 502,151

[22] Filed: Mar. 30, 1990

[51] Int. Cl.$^5$ ............................................. G01V 1/28
[52] U.S. Cl. ....................................... 367/38; 367/73
[58] Field of Search ........................... 367/73, 37, 38; 364/421

[56] References Cited

U.S. PATENT DOCUMENTS

| | | | |
|---|---|---|---|
| 3,159,231 | 12/1964 | Silverman | 367/73 |
| 4,415,999 | 11/1983 | Moeckel et al. | 367/73 |
| 4,817,062 | 3/1989 | De Buyl et al. | 367/73 |
| 4,969,130 | 11/1990 | Wason et al. | 367/73 |
| 4,972,383 | 11/1990 | Lailly | 367/73 |
| 4,982,382 | 1/1991 | Dablain | 367/73 |

OTHER PUBLICATIONS

E. B. Reynolds, "Predicting Overpressured Zones with Seismic Data" World Oil, 171, 78–82, pp. 235–239.
B. L. Aleksandrov, "Effect of Depth and Pore Pressure on the Velocity of Seismic Waves in the Clays".
D. G. Stone, "Predicting Pore Pressure and Porosity from VSP Data".
B. E. Shapiro, et al., "Seismic Inversion of Vertical Seismic Profile Data for Predicting Abnormal Pressure Beyond TD", OTC 5069, May 6–9, 1985, 453, 454.
S. Brun, et al., "Prediction of Overpressure in Nigeria Using Vertical Seismic Profile Techniques", SPWLA 26 Annual Logging Symposium, Jun. 17–20, 1985, 1–11.
E. S. Pennebaker, "An Engineering Interpretation of Seismic Data", SPE 2165, 1968, pp. 1–9.
C. E. Hottmann, et al., "Estimation of Formation Pressures from Log-Derived Shale Properties", Journal of Petroleum Technology, Jun., 1965, 717–722.

Primary Examiner—Ian J. Lobo
Attorney, Agent, or Firm—Timothy D. Stanley

[57] ABSTRACT

Methods of geophysical exploration are provided for estimating the burial conditions of sedimentary material in a selected basin. The burial conditions can include measures of porosity, lithology, pore fluid pressure, effective pressure, and density. In particular, a reference velocity profile is developed for a model of the sedimentary material comprising the basin and is compared to a velocity profile obtained from seismic data to obtain estimates of the burial conditions of the sedimentary material.

30 Claims, 6 Drawing Sheets

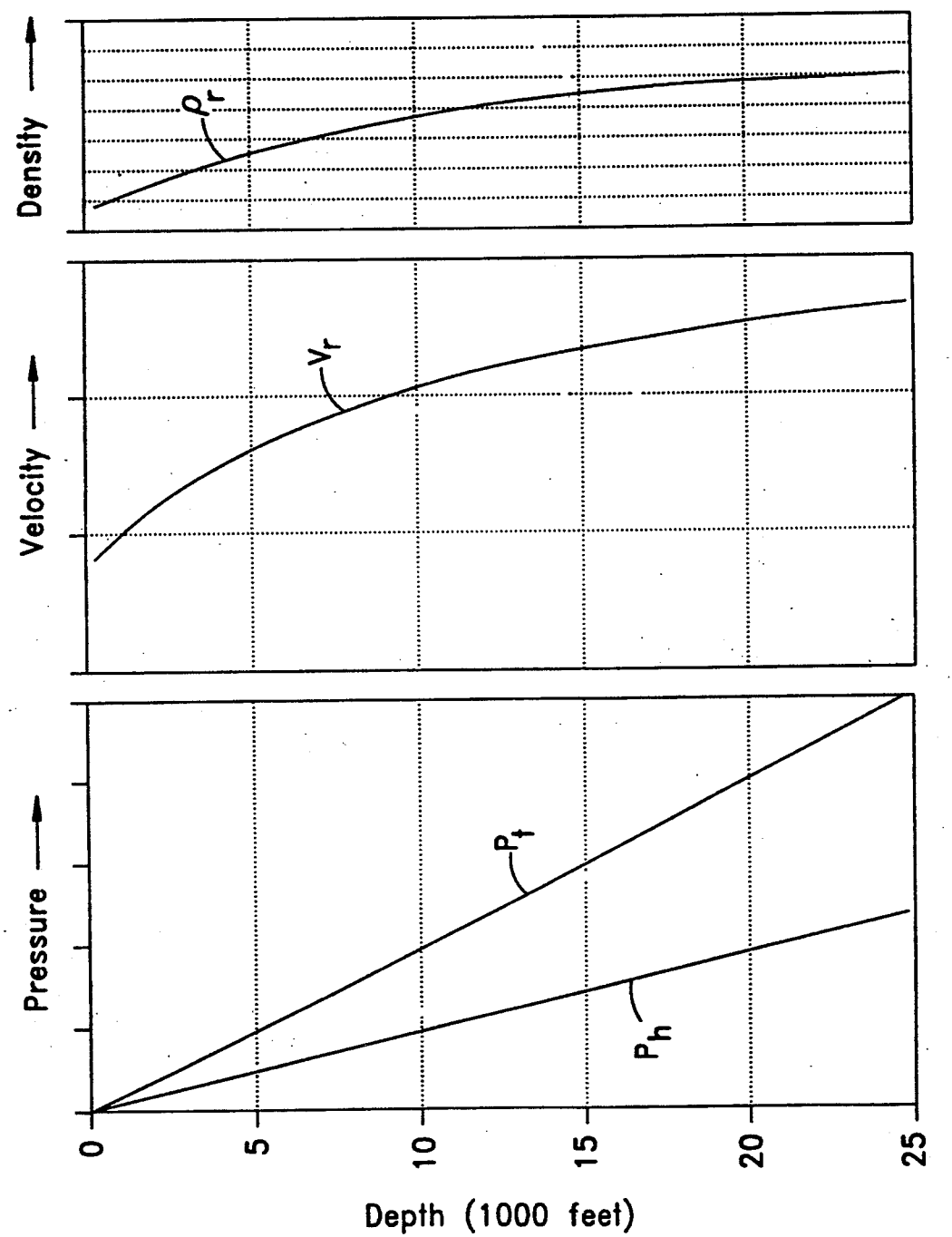

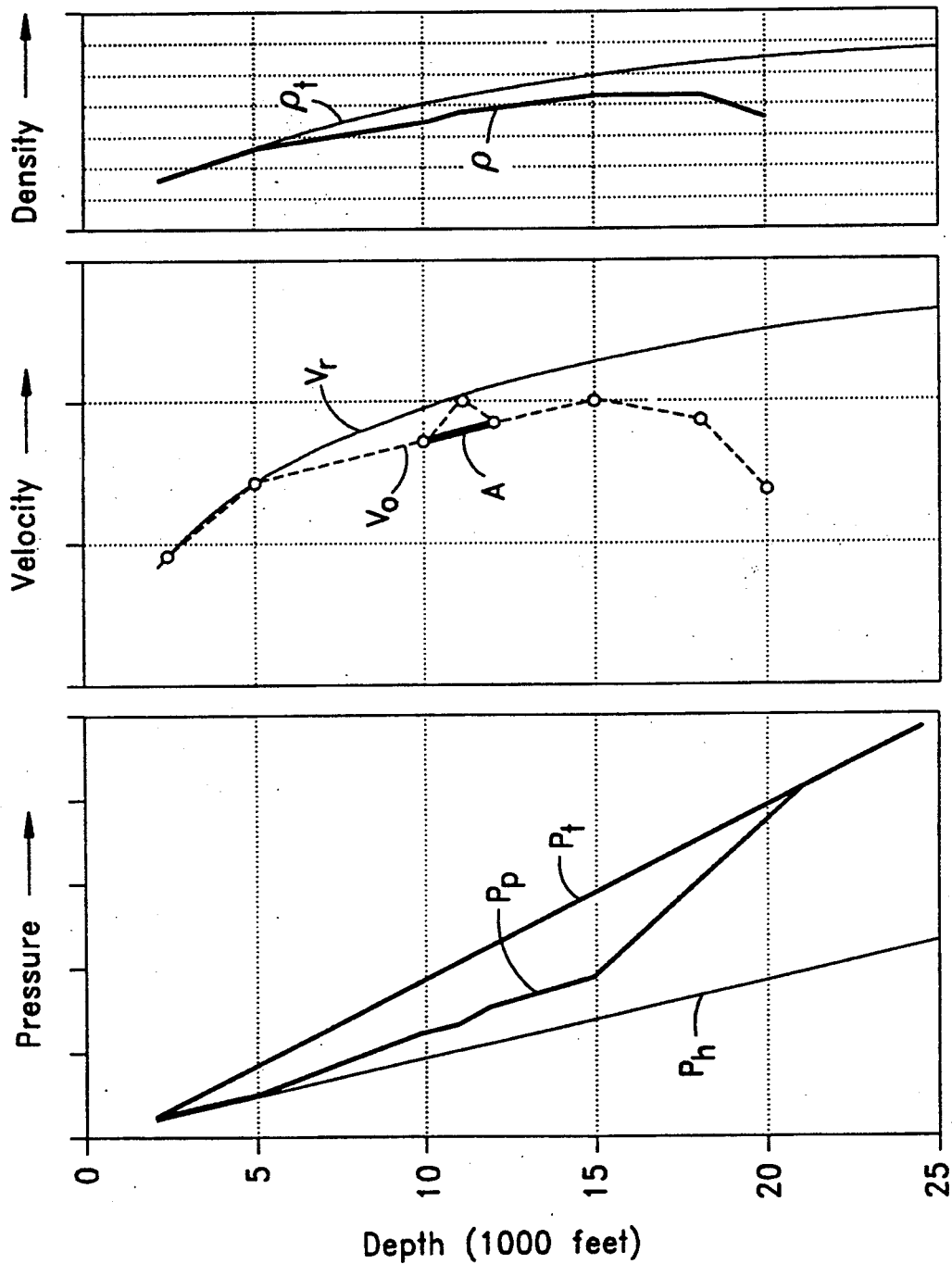

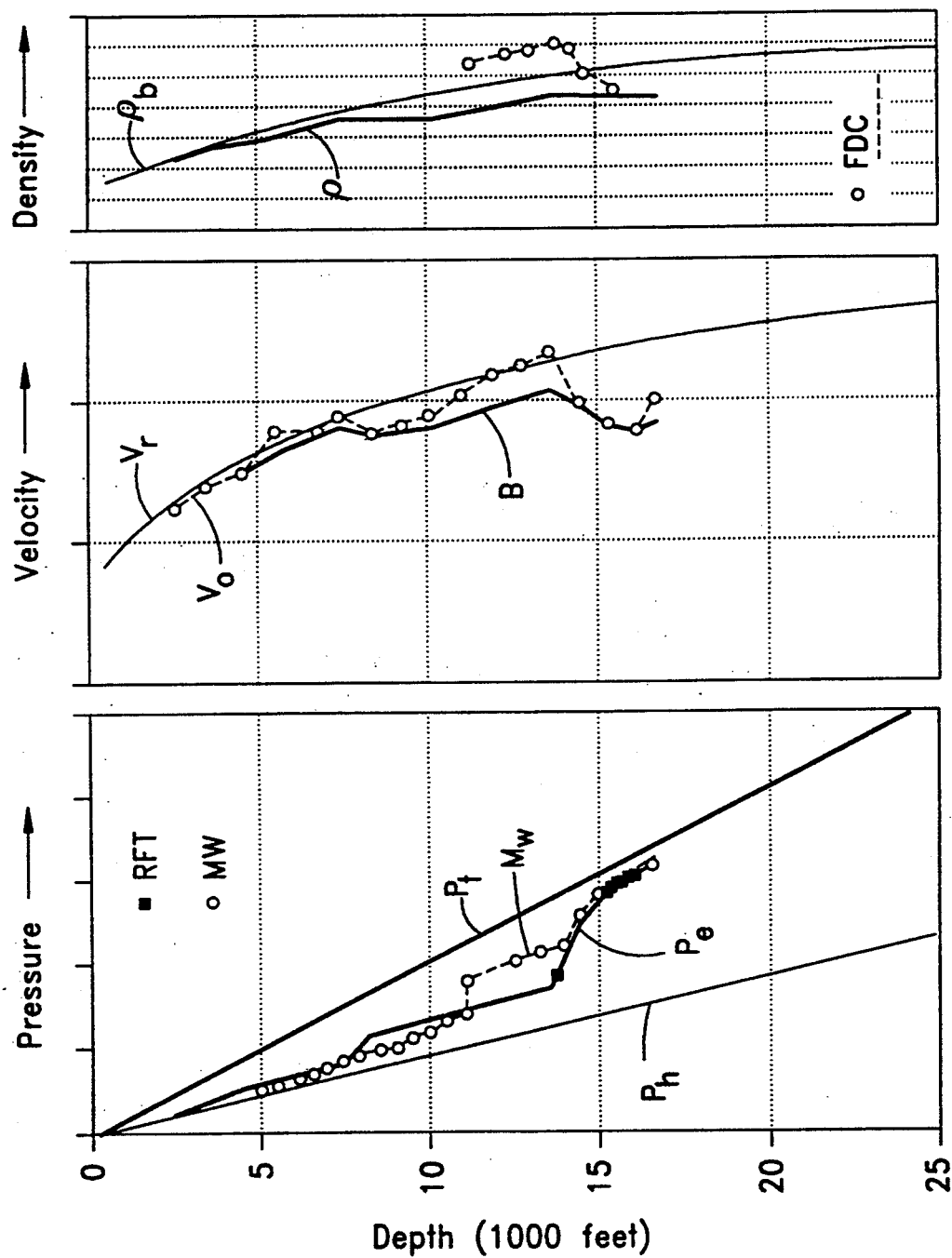

METHODS FOR ESTIMATING THE BURIAL CONDITIONS OF SEDIMENTARY MATERIAL

BACKGROUND OF THE PRESENT INVENTION

The present invention relates generally to geophysical exploration and more particularly to methods for estimating the burial conditions of sedimentary material in the earth's subsurface.

In the continuing search for hydrocarbons in the earth's subsurface formations, explorationists seek to understand the sequence and conditions under which sedimentary materials are buried in order to better locate hydrocarbon deposits as well as to more economically and safely control the drilling process necessary to tap such resources. In particular, geophysicists seek estimates of elements of the burial or compaction conditions of sedimentary materials in the earth's subsurface, including density, lithology, porosity and pore fluid pressure.

While the use by explorationists of the compaction conditions can be extremely useful in evaluating the earth's formations, prior knowledge of in-situ pore fluid pressure can be extremely important to drilling personnel because of the hazards associated with drilling into overpressured formations (i.e., those where pore fluid pressure is greater than normal hydrostatic pressure). The hazard arises because such overpressured fluids can eject themselves up the borehole and out the top, creating a substantial safety hazard to the drilling crew. The Gulf Coast of Mexico is notorious for such overpressured formations and the ability to predict their occurrence can greatly reduce the hazards associated with drilling into such overpressured formations.

Present techniques for estimating in-situ pore fluid pressure at a particular locale typically comprise statistically combining data obtained from a wellbore (e.g., vertical seismic profile (VSP) or sonic or resistivity logging data) and downhole measurements of pore fluid pressures from other locales. Since these methods are empirically derived, it is necessary to determine the coefficients of fit each time the methods are employed at different locales, even within the same sedimentary basin.

The methods for estimating the burial conditions of sedimentary material of the present invention have substantial advantages over existing techniques. The most significant of these advantages is the ability to estimate in-situ pore fluid pressures from surface seismic data alone. Pore fluid pressure predictions obtained in this manner can reduce the danger and added expense of exploratory drilling in overpressured formations. Since the nature of the in-situ pore fluid pressure estimates in the present invention is determinative, rather than empirical, no adjustments of the coefficients of fit are required at different locales within a selected sedimentary basin.

SUMMARY OF THE INVENTION

The present invention relates generally to geophysical exploration and more particularly to methods for estimating the burial conditions of sedimentary material.

In one embodiment of the present invention, a reference velocity profile is developed for a modeled column of sedimentary material representative of the sedimentary material comprising a selected sedimentary basin. An observed velocity profile, obtained from seismic data encompassing a particular location of interest in the sedimentary basin, is compared to the reference velocity profile to obtain estimates of the burial conditions of the sedimentary material at the location of interest in the sedimentary basin. More particularly, the modeled sedimentary material is assumed to have been compacted under hydrostatic pore fluid pressure conditions. Additionally, the modeled sedimentary material is assumed to be comprised of only a single lithological material which is generally representative of the predominant lithology in the sedimentary basin of interest. Deviations in the observed velocity profile from the reference velocity profile can be representative of variations in porosity, lithology, and/or pore fluid pressure of the sedimentary material from that assumed for the modeled sedimentary material.

In another aspect of the present invention, an observed velocity profile of in situ sedimentary materials in a selected sedimentary basin can be obtained from both surface seismic data as well as from wellbore sonic data. When wellbore sonic data are employed, it is preferred to smooth such wellbore sonic data so as to average out rapid lithologic variations in the sedimentary material as a function of depth.

A unique aspect of the present invention is that it accounts for velocity variations due to porosity variations, which can occur with or without pore-pressure variations, by recognizing certain consequences of the burial history of the sedimentary basin, and also by considering the local velocity gradient. These and other features of the present invention are depicted in the figures and more completely discussed below.

BRIEF DESCRIPTION OF THE DRAWINGS

FIGS. 2a, b, and c are reference profiles of pore fluid pressure, confining pressure, velocity and density for a modeled column of sedimentary material;

FIGS. 3a, b, and c comprise a comparison of a synthetic velocity profile with a reference velocity profile to obtain estimates of pore fluid pressure and density; and FIGS. 4a, b, c, comprise a comparison of observed velocities obtained from surface seismic data with a reference velocity profile to obtain estimates of pore fluid pressure and density.

DETAILED DESCRIPTION OF THE INVENTION

Figure 1A:
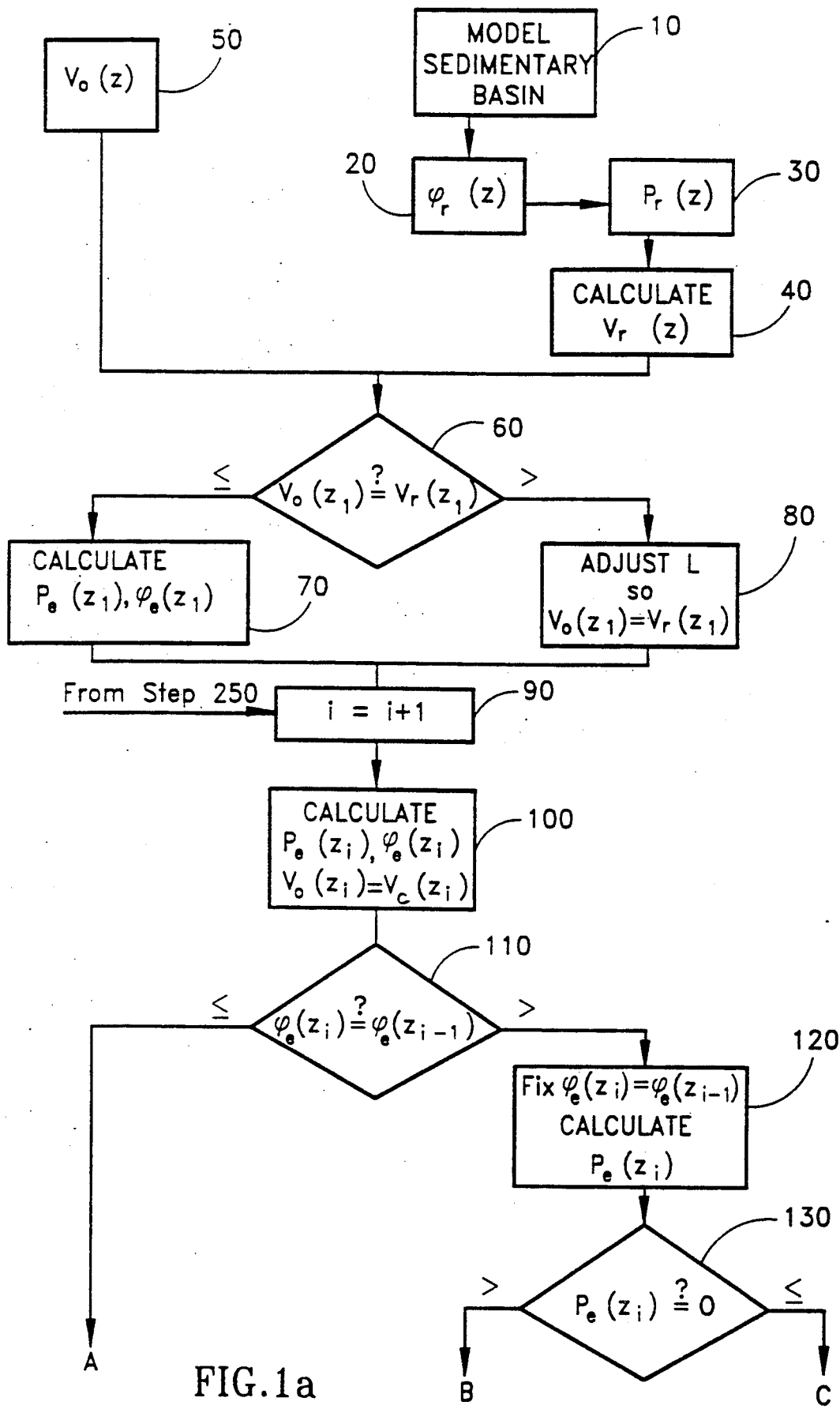
FIGS. 1a, b, c comprise a flow diagram of the present invention.

In order to better understand the present invention, the following introductory discussion is presented. As used herein, effective pressure P is the difference between total (overburden) vertical stress $P_t$ and the pore fluid pressure $P_p$ according to:

$$P = P_t - P_p \tag{1}$$

In nature, effective pressure P is almost always positive.

Laboratory studies of seismic velocity in sedimentary materials indicate a general dependence of seismic velocities on effective pressure at the time of measurement. Specifically, as effective pressure is decreased, a decrease in both compressional and shear wave seismic velocities can be observed. Thus, seismic velocities can provide an estimate of effective pressure as well as estimates of in-situ pore fluid pressures as seen in Eq. (1). In fact, geophysicists have qualitatively recognized an association between abnormally low seismic velocities and high in-situ pore fluid pressures.

Empirical relationships have been developed in an attempt to statistically quantify the relationship between in-situ pore fluid pressure and seismic velocity. However, the reliability of such empirical relationships tends to be poor because seismic velocity also depends on the porosity $\phi$ and lithology L of sedimentary materials. In order to overcome these problems, I have recognized that it is first necessary to develop a general velocity expression which incorporates these additional variables, such as:

$$V_c = V_1(1 - a_1 L - a_2 \phi + a_3 P) \tag{2}$$

where $V_1$, $a_1$, $a_2$, and $a_3$ are constants, and $V_c$ is a calculated velocity.

Eq. (2) is an example from a broad class of expressions which one can develop, using laboratory data on selected sedimentary materials, for relating seismic velocity to selected elements of the burial conditions of sedimentary materials, including in this example: lithology, porosity and effective pressure. Quantitative measurements of porosity $\phi$ and effective pressure P are straight forward. Quantitative measurements of lithology L, as employed herein, can be a simple description of lithology which has a defined relationship to seismic velocity. While Eq. (2) may be oversimplified, it does highlight the nonuniqueness of prior attempts to empirically relate changes in velocity simply to changes in in-situ pore fluid pressure, neglecting other burial conditions.

While it is known that the porosity $\phi$ of sedimentary materials usually decreases with increasing depth of burial, the process of compaction is controlled principally by increases in effective pressure P and can be described according to:

$$\phi = \phi_o e^{-a_4 P} \tag{3}$$

where $\phi_o$ and $a_4$ are constants and P is effective pressure.

Eq. (3) is exemplary of a broad class of compaction rules. Generally, it is preferable to calibrate both Eqs. (2) and (3) with measurements obtained on sedimentary material from the same general sedimentary basin to evaluate these constants. Having done so, it will be shown below that Eqs. (2) and (3) can now have widespread utility in obtaining estimates of the burial conditions of sedimentary material within a selected sedimentary basin.

While it is possible to empirically determine compaction rules similar to Eq. (3) in the laboratory, such compaction rules would not reflect a state of geological equilibrium, as does Eq. (3). However, such laboratory experiments would highlight an aspect of sedimentary compaction which is not explicit in Eq. (3) i.e., irreversibility. Simply stated, once a buried sedimentary material has undergone compaction in response to increasing effective pressure and geochemical lithification, the buried sedimentary material is unlikely to dilate (i.e., increase its porosity) upon a subsequent decrease in effective pressure. Instead, it is more likely that, in zones where the effective pressure is decreasing as a function of depth, the porosity will reflect the maximum effective pressure applied to the rock during burial, not the current effective pressure. In such circumstances, the direct link between porosity and effective pressure (as, for example, in Eq. (3)) can be broken.

This discussion of irreversible compaction illustrates how useful it would be to know the burial conditions earlier in the history of a particular column of sedimentary material. In my discovery, it is assumed that the present-day burial conditions in a column of sedimentary material can provide an estimate of conditions earlier in the history of the same column. For example, when sedimentary material now at 10,000 ft was at 5000 ft, its burial conditions probably resembled the burial conditions of material now at 5000 ft.

A first step in undertaking the present invention is to develop a reference model of the sedimentary basin of interest. The reference sedimentary material of the modeled sedimentary basin is constrained to a single reference lithology. Preferably, the reference lithology is generally representative of the predominant lithology having the slowest seismic velocity for the selected sedimentary basin. Additionally, the reference sedimentary material is assumed to have been buried under conditions of hydrostatic pore fluid pressure at each depth increment. Employing such assumptions, one can develop a set of reference profiles which are representative of selected elements of the burial conditions for the modeled sedimentary basin, including a reference velocity profile. Additionally, an observed velocity profile can be obtained from surface seismic data or wellbore sonic data at a selected locale in the selected sedimentary basin of interest. As will be explained in more detail below, by comparing the observed velocity profile with the reference velocity profile, one can obtain estimates of the burial conditions of the sedimentary material at the selected locale in the sedimentary basin.

Looking now to FIG. 1, a flow diagram of the present invention is provided for obtaining estimates of the burial conditions for sedimentary material within a selected sedimentary basin. At step 10, a model of the selected sedimentary basin of interest is developed. In particular, the reference sedimentary material comprising the modeled basin is assumed to have a uniform reference lithology $L_r$ which is generally representative of the predominant lithology of the selected sedimentary basin. Additionally, the reference sedimentary material is assumed to have been compacted under conditions of hydrostatic pore fluid pressure $P_h(z)$. Employing the above assumptions and Eqs. (2 and 3), a reference porosity profile $\phi_r(z)$, a reference effective pressure profile $P_r(z)$, and a reference velocity profile $V_r(z)$ can be obtained for the modeled sedimentary basin as described below.

At step 20, the reference porosity profile $\phi_r(z)$ can be developed from compaction data (i.e., porosity measurements) obtained at other locations in the selected sedimentary basin of interest, or from similar sedimentary basins elsewhere. A reference sedimentary material bulk density profile $\rho_r(z)$ can also be determined according to:

$$\rho_r(z) = \phi_r(z)\rho_f + (1 - \phi_r(z))\rho_g \tag{4}$$

where $\rho_f$ and $\rho_g$ are the densities of the fluid and the solid grains, respectively, of the reference sedimentary material At step 30, the reference effective pressure profile $P_r(z)$ can be calculated employing Eq. (1) where the overburden pressure $P_t(z)$ and hydrostatic pore fluid pressure $P_h(z)$ are specified by:

$$P_t(z) = \int_0^z g\, \rho_r(z) dz \quad (5)$$

$$P_h(z) = g\, \rho_f z \quad (6)$$

In FIG. 2a, the profile labeled $P_h$ represents hydrostatic pore fluid pressure as a function of depth for the modeled sedimentary basin. Similarly, the profile labeled $P_t$ represents the total overburden pressure for the modeled sedimentary basin. A reference bulk density profile $\rho_r$, as described above, is depicted in FIG. 2c.

Employing a relationship such as Eq. (2), which relates sedimentary material velocity to elements of the burial conditions of the sedimentary material (e.g., effective pressure, porosity and lithology), a reference velocity profile $V_r(z)$ can be obtained for the modeled sedimentary basin at step 40 of FIG. 1a employing the reference profiles for lithology, porosity and effective pressure. The constants in Eq. (2) can be determined from laboratory data.

The constants in Eq. (3) can be evaluated by combining the compaction data and the reference effective pressure profile $P_r(z)$. Preferably Eqs. (2) and (3) are calibrated with data obtained from the selected sedimentary basin. However, it is important to note that all of the above steps can be implemented without any site-specific information about the sedimentary material.

The reference velocity profile $V_r(z)$ developed at step 40 for the modeled sedimentary basin is depicted in FIG. 2b. Since the reference lithology $L_r$ was assumed to be uniform, the shape of the reference velocity profile $V_r(z)$ is due to variations in the reference profiles for effective pressure and porosity.

At step 50, an observed velocity profile $V_o(z)$, specific to a site of interest within the selected sedimentary basin, can be obtained in a number of well-known ways. In the present invention, it is preferred that the observed velocity profile $V_o(z)$ be generated from interval velocities obtained from surface seismic data. By their nature, interval velocities average local velocities over lengths comparable to seismic wavelength, thus enabling one to ignore thin layers of anomalous lithology.

At step 60, the velocity profiles $V_o(z_1)$ and $V_r(z_1)$ are compared at an initial depth $z_1$, i.e., the shallowest depth for which $V_o(z)$ exists. Hereafter, a subscript i is used to indicate a selected depth. If the velocity $V_o(z_1) \leq V_r(z_1)$ at step 60, then an estimate of the effective pressure $P_e(z_1)$ for the sedimentary material of interest can be calculated at step 70, using the compaction and velocity relationships of Eqs. (3) and (2), the observed velocity $V_o(z_1)$, and the reference lithology $L_r$ for the reference sedimentary material. In particular, both the observed velocity $V_o(z_1)$ and the reference lithology $L_r$ are input into Eq. (2), and Eq. (3) is substituted into Eq. (2) to eliminate the porosity term and obtain a measure of the estimated effective pressure $P_e(z_1)$ for the sedimentary basin. Additionally, an estimate of the porosity $\phi_e(z_1)$ for the sedimentary basin of interest can be obtained with the aid of the estimated effective pressure $P_e(z_1)$ and Eq. (3).

However, if the velocity $V_o(z_1) > V_r(z_1)$ at step 60, then the reference measure for the lithology $L$ of the sedimentary material is adjusted at step 80 until a calculated velocity $V_c(z_1)$ obtained from Eq. (2) is equal to the observed velocity $V_o(z_1)$. A revised estimate of the lithology $L_e$ (not equal to the reference lithology $L_r$) for the sedimentary basin of interest can thus be obtained. It should be noted that the estimated porosity and effective pressure for the sedimentary basin of interest, at step 80, are the reference values for the modeled sedimentary basin at the initial depth.

At step 90, the process is advanced to the next greater depth (i+1) for which an observed velocity $V_o(z_i)$ exists. As an initial estimate, the estimated effective pressure $P_e(z_i)$ at the next depth is obtained by constraining the calculated velocity $V_c(z_i)$ in Eq. (2) to equal the observed velocity $V_o(z_i)$ for that depth increment at step 100 and by setting the lithology term $L = L_r$. The porosity term of Eq. (2) is replaced by Eq. (3). The estimated effective pressure $P_e(z_i)$ can then be employed in Eq. (3) to obtain a revised estimate of porosity $\phi_e(z_i)$ for the sedimentary basin.

At step 110, the porosity estimate $\phi_e(z_i)$ obtained at step 100 is compared with the porosity estimate obtained at a previous depth increment $\phi_e(z_{i-1})$. The effect of the comparison at step 110 is to constrain the estimated porosity to be no greater than that at the previous depth increment. If the estimated porosity $\phi_e(z_i) \leq \phi_e(z_{i-1})$, then the estimates of porosity, effective pressure, and lithology previously obtained can be carried forward to step 150 below. If the estimated porosity $\phi_e(z_i) > \phi_e(z_{i-1})$, then the estimate of porosity $\phi_e(z_i)$ for the sedimentary material at depth increment i is decreased and set equal to the previous value of porosity $\phi_e(z_{i-1})$ at step 120. In effect, one has assumed that when the sedimentary material now at depth $z_i$ was at depth $z_{i-1}$, its porosity was $\phi_e(z_{i-1})$, and that no dilation has occurred. A new estimate of effective pressure $P_e(z_i)$ for the sedimentary material can then be obtained from Eq. (2) and the observed velocity $V_o(z_i)$.

The new estimate of effective pressure $P_e(z_i)$ will generally be lower as it compensates for a decrease in $\phi_e(z_i)$. If the estimated effective pressure $P_e(z_i)$ obtained at step 120 is less than or equal to zero, then the effective pressure $P_e(z_i)$ is set equal to zero at step 140 and the estimate of porosity $\phi_e(z_i)$ is increased so that $V_c(z_i)$ from Eq. (2) agrees with the observed velocity $V_o(z_i)$.

With the estimate of effective pressure $P_e(z_i)$ from either step 140, step 120, or step 100, an estimate of pore fluid pressure $P_f(z_i)$ for the sedimentary material can be obtained at step 150 using Eq. (1). This involves a calculation of the total stress $P_t$ using Eq. (5). Additionally, an estimated pore fluid pressure gradient $\Delta P_f$ can be obtained at step 150 by determining the change in pore fluid pressure over the distance $\Delta z$ between adjacent depths i.

At step 160, the hydrostatic pore fluid pressure gradient $\Delta P_h$ (i.e., the change in hydrostatic pore fluid pressure over a selected distance) is compared to the estimated pore fluid pressure gradient $\Delta P_f$. If the estimated pore fluid pressure gradient $\Delta P_f$ is greater than or equal to the hydrostatic pore fluid pore pressure gradient $\Delta P_h$, then the estimates of porosity and effective pressure for the sedimentary material are carried forward for this depth increment to step 240 below.

However, if the estimated pore fluid pressure gradient $\Delta P_f$ at step 160 is less than the hydrostatic pore fluid pressure gradient $\Delta P_h$, then $\Delta P_f$ is set equal to $\Delta P_h$ at step 170. That is, the pore fluid pressure $P_f(z_i)$ at depth i is increased and set equal to $P_f(z_{i-1}) + \Delta P_h \Delta z$ (where $\Delta z = z_i - z_{i-1}$). A revised estimate of effective pressure $P_e(z_i)$ can be obtained using Eq. (1). If the resulting increased estimate of porosity $\phi_e(z_i)$ (obtained using Eq.

(3) and the revised estimate of effective pressure $P_e(z_i)$) is greater than $\phi_e(z_{i-1})$, the porosity at depth (i) can be set equal to that at the previous depth increment (i-1) at step 200.

The revised estimate of effective pressure $P_e(z_i)$ from step 170 and the revised estimate of porosity $\phi_e(z_i)$ from step 190 or 200 are used to calculate a new, revised value of velocity $V_c(z_i)$ at step 210 using Eq. (2). At step 220, this new value is compared to $V_o(z_i)$. If $V_c(z_i)$ is less than $V_o(z_i)$, the lithology L term of Eq. (2) is adjusted at step 230 so that $V_c(z_i) = V_o(z_i)$.

At step 240, revised estimates of the burial conditions for the sedimentary material comprising the sedimentary basin (including $\phi_e$, $P_e$, $P_f$, and L) are collected for depth increment i. At step 250, the process is then incremented to the next greater depth by returning to step 90, and the sequence is repeated until the depth interval for which the observed velocity $V_o(z)$ exists has been covered.

At any point in the logical flow described above, a priori information may be utilized to alter the logic at any depth. For example, if it is known that salt beds lie between 10,000 ft and 15,000 ft in the area of interest, those depth intervals can be flagged appropriately. Then, when the flagged depth intervals are reached, the appropriate step can be altered with data about the bed. For example, if the bed is known to be salt, step 160 can be altered so as to replace $\Delta P_h$ with $\Delta P_l$ (since the local pore pressure gradient for a salt bed is lithostatic), and likewise at step 170. Alternatively, the in situ burial conditions at shallow depths, which may be known from shallow drilling, may be used in steps 60–80 to initialize the profiles. Similarly, a priori knowledge, of any sort applicable to any depth range, can be used to modify the logical flow at any decision point in the flow diagram of FIG. 1.

EXAMPLE USING SYNTHETIC DATA

Looking now to FIGS. 3A, 3B, and 3C, the methodology for obtaining estimates of the burial conditions of sedimentary material will now be described with the aid of synthetic surface seismic data obtained for a modeled sedimentary basin. By processing the synthetic seismic data, one can obtain estimates of formation interval velocities. In FIG. 3B, an observed interval velocity profile $V_o(z)$ can be obtained for a particular location from the synthetic seismic data set and plotted along with a reference velocity $V_r(z)$ calculated for the modeled sedimentary basin as previously described at steps 10–50 of FIG. 1. The observed velocity profile $V_o(z)$ has low vertical resolution (as indicated by the sparse data points); nevertheless, this is adequate since in-situ pore fluid pressure generally varies slowly in comparison to formation lithology and porosity variations.

Note that in this example the water depth is about 2000 ft. This is significant in the calculation of total vertical stress $P_t$ using Eq. (5) at step 150. Specifically, $P_t$ is equal to the hydrostatic pressure $P_h$ at the seafloor.

At a first point on the observed velocity profile $V_o(z)$ (i.e., 2500 ft), the observed velocity is equal to the reference velocity $V_r(z)$. This is interpreted to indicate that the effective pressure, density (and hence porosity), and lithology are all equal to their reference values. The same interpretation applies to the interval down to 5000 ft, where the observed velocity is also equal to the reference velocity.

In the interval from 5000 to 10,000, which is typical of undercompacted columns of uniform sedimentary material, the observed velocity $V_o$ increases more slowly than the reference velocity $V_r$. With the assumption of generally uniform lithology, the estimates of effective pressure and porosity will decrease and the estimate of pore fluid pressure will increase. One can see that the estimates of pore fluid pressure $P_f$ and bulk density $\rho_e$ (and hence porosity) depart from the reference values in FIGS. 3A and 3C while the estimate of lithology is assumed to remain fixed.

In this interval, the estimates of porosity and effective pressure do not violate the requirement of irreversible compaction (at step 110 of FIG. 1) or pore fluid pressure gradient (at step 160 of FIG. 1). However, the initial estimates of porosity and effective pressure obtained in step 100 of FIG. 1 can lead to violations of these requirements when the velocity variations are more extreme. Under these circumstances, one must change the balance of the terms in the velocity expression set forth in Eq. (2) to modify the prediction so as to obtain a more plausible result. These modifications are described below.

If, while proceeding down the column of sedimentary material, the observed velocity $V_o$ increases rapidly (e.g., at pt A in FIG. 3b), the use of the observed velocity in Eq. (2) to estimate porosity $\phi_e$ and pore fluid pressure $P_f$ would yield a rapid increase in effective pressure and a decrease in porosity for the same lithology. Moreover, large increases in observed velocity $V_o$ can yield an estimated pore fluid pressure gradient $\Delta P_f$ that is less than hydrostatic pore fluid pressure gradient $\Delta P_h$. This is unreasonable in a young sedimentary basin, such as the Gulf Coast. Such pore fluid pressure conditions are rarely, if ever, observed in such sedimentary basins, and are only easily explained by substantial uplift and erosion.

Figure 1B:
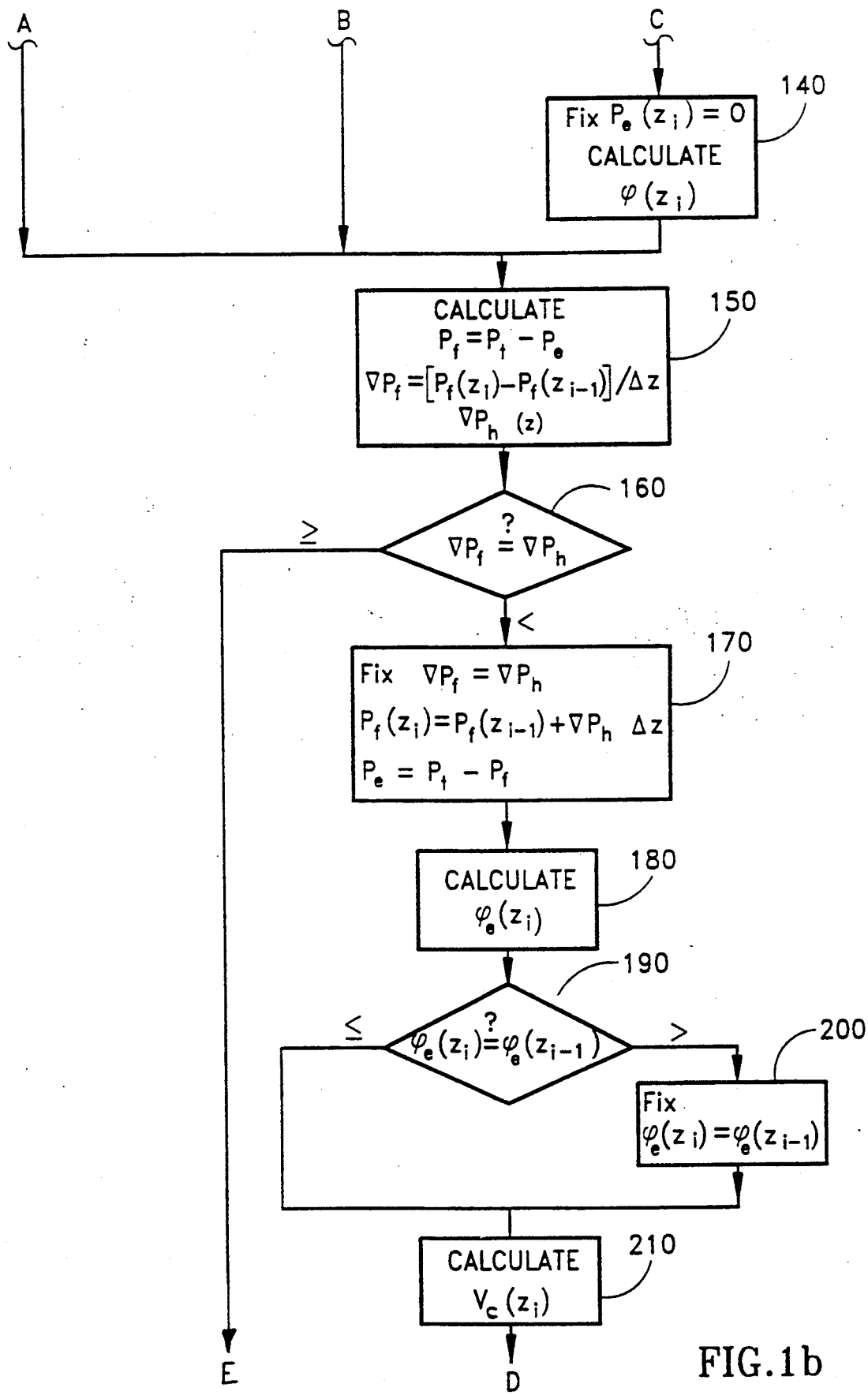
Figure 1C:
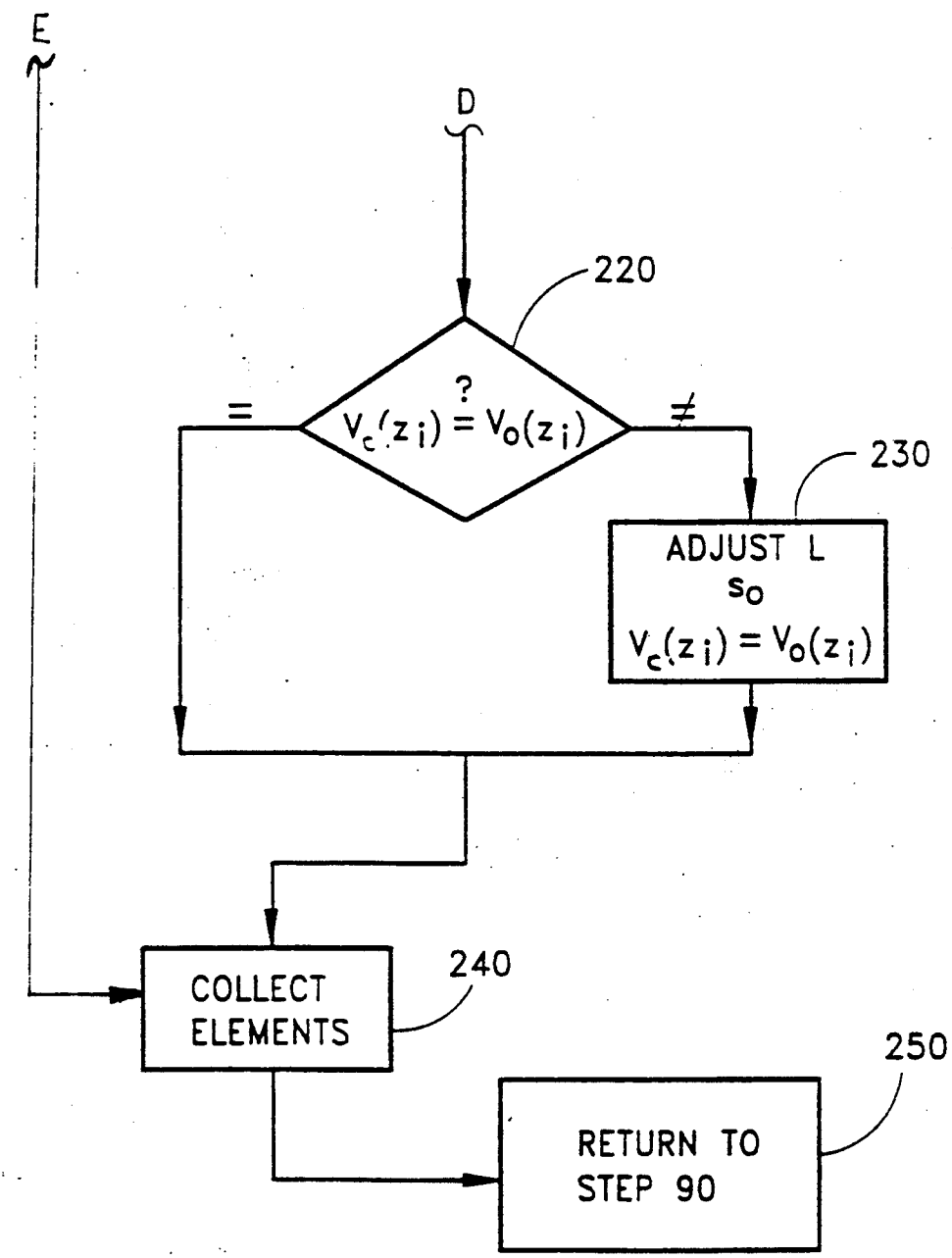

The present method responds by constraining the estimated pore fluid pressure gradient $\Delta P_f$ to be, at a minimum, hydrostatic over the depth interval of rapid velocity increase, e.g., see step 170 of FIG. 1B. This leads to a prescription of the estimated effective pressure $P_e$ at the base of the interval, and fixes the porosity according to the compaction assumptions of Eq. (3). Substitution of this effective pressure and porosity into the velocity relationship of Eq. (2) yields a calculated velocity that is lower than the observed velocity $V_o$ and the reference velocity, $V_r$ as shown by the bold face line A in FIG. 3b. The difference between these velocities is attributed to a lithology change, which can be accounted for by altering the lithology term of Eq. (2) as seen at step 230 of FIG. 1c.

The difference between the observed and calculated velocities is thus a crude prediction of variations in lithology. However, variations in effective pressure and porosity over an interval are the primary predictions of the in-situ conditions in a horizon of faster lithology. In particular, these values are used when deciding whether corrections to the simple prediction are needed over the next depth interval.

The following section describes how anomalous decreases in observed velocity can be attributed to high pore fluid pressure. The lithology correction prevents the decrease at the base of a lithologically fast layer from being interpreted in this way. The interval between 11,000 ft and 12,000 ft in FIG. 3b illustrates this feature. Where decreases in the observed velocity could be attributed to lithologies even slower than the reference lithology, it is more reasonable to attribute the observations to low effective pressures. This logic tends to produce conservative estimates of $P_f$, which are inherently safer when used as predictors by drilling engineers. If the observed velocity decreases with depth, as between 15,000 ft and 18,000 ft in FIG. 3b, the application of Eq. (3) predicts a decrease in estimated effective pressure and an increase in estimated porosity with depth. The decrease in effective pressure, corresponding to an increase in estimated pore fluid pressure, is reasonable; indeed it is one of the main phenomena that this method sets out to quantify. However, since compaction is irreversible, the estimated porosity should reflect the maximum effective pressure to which the sedimentary material was ever subjected, not the present effective pressure. Hence, the estimated porosity should be lower than the simple prediction. If the porosity is decreased, the effective pressure must also be decreased to account for the lower observed velocity. This correction therefore has the desirable, conservative result of moving the pore fluid pressure prediction upwards.

In practical terms, this correction is performed as follows. When an increase in estimated porosity as a functional depth is predicted, the present method reacts by prescribing a constant porosity over that depth interval, and decreases the effective pressure to fit the observed velocity. This occurs between 15,000–18,000 ft in FIG. 3c, where the density remains representative of the maximum effective pressure at 15,000 ft.

Applying the above procedure to a large decrease in observed velocity, as shown between 18,000 ft and 20,000 ft in FIG. 3B, leads to an estimated predicted effective pressure that is negative. In this case the effective pressure is set to zero, as at step 140, and the porosity is minimally increased to fit the observed velocity. At 20,000 ft, where the predicted effective pressure is zero, the predicted pore fluid pressure and total pressure are equal. In general, it can be seen that while in-situ pore fluid pressure increased between 15000–20000, the observed velocity decreased. However, within this interval, both effective pressure and porosity varied separately according to the rate at which the observed velocity decreased.

EXAMPLE USING FIELD DATA

The present invention was also tested on field data in which both velocity data as well as in-situ pore fluid pressure data were obtained. Looking now to FIG. 4, the present method was applied to a well in the Gulf of Mexico. The observed velocity profile $V_o$ used as input in the following example is deliberately sparse, with only one data point every 500–1000 ft. The estimates of in-situ pore fluid pressure and density obtained in accordance with the present invention are compared with corresponding field measurements of these properties.

The best measurements of in-situ pore fluid pressures are made with wireline "repeat formation testers" (RFTs). The RFT tool has the capability of sampling formation fluids, but is also very effective and accurate in measuring pore fluid pressures. A drawback is that RFT measurements can only be made in reasonably permeable formations. The more traditional method for measuring in-situ pore fluid pressures is by inference from mud weights (MW) used while drilling. This generally provides an upper bound on the pore fluid pressure; however, it is insensitive to decreases in the pore fluid pressure gradient. Nevertheless, mud weights have the advantage that a continuous pore fluid pressure profile can be obtained therefrom. Both types of in-situ pore fluid pressure measurements were used for comparison with the estimates shown in FIG. 4a.

Estimated density $\rho$ is compared with the modeled bulk density $\rho_r$ and density obtained from a compensated density log (FDC) in FIG. 4c.

In this example, the in-situ pore fluid pressure is normal or moderately high from the surface down to 14,000 ft as indicated in FIG. 4a by both the estimated pore fluid pressure $P_e$ and mud weight MW determination of pore fluid pressure. The section from 11,000 ft to 14,000 ft was probably overbalanced (mud weight->pore fluid pressure) during drilling; this was noted in the post-well appraisal after a cased-hole RFT measurement was made at 13,833 ft. At 14,000 ft, the estimated in-situ pore fluid pressure $P_e$ abruptly climbs to approach confining pressure $P_t$ and remains high to total depth as confirmed by both RFT and mud weight determinations.

The most obvious feature in the observed velocity profile $V_o(z_i)$ is the abrupt decrease in velocity at 14,000 ft, attributable to the low effective pressure (i.e., high pore fluid pressure). The trend of steadily increasing observed velocity shown above 14,000 ft is consistent (yet generally less than the reference velocity) with a steady decrease in porosity, with increasing effective pressure and increasing pore pressure during burial.

The interpretation of this observed velocity profile calls on almost every feature of the present method. In particular, a review of FIGS. 4a,b,c shows the following:

1. The observed velocity profile $V_o$ down to ~4500 ft is slightly less than the reference velocity profile $V_r$. Consequently, pore fluid pressure estimates $P_e$ can be calculated to be slightly greater than hydrostatic $P_h$.
2. At 4500 ft, the observed velocity $V_o$ increases rapidly and a simple prediction would yield a pore fluid pressure gradient less than hydrostatic. Consequently, the effective pressure and porosity are adjusted to be consistent with a hydrostatic pore fluid pressure gradient, and a lithology change as indicated by bold line B representative of a lithology-corrected velocity. Thereafter, the observed velocity $V_o$ remains close to the reference velocity $V_r$ up to 8000 ft. Thus, a return to the original lithology can be inferred. These corrections are necessary down to about 8000 ft. The predicted pore fluid pressure gradient from 4500 ft to 8000 ft is hydrostatic.
3. The decrease in observed velocity at 8000 ft would, without the lithology-correction feature of the present method, be attributed to a substantial increase in pore fluid pressure. Instead, most of the decrease is correctly attributed to a return to shaly lithology having the same porosity.
4. From 9000 ft down to 14,000 ft, a steady increase in observed velocity is partly attributed to a faster lithology. The pore fluid pressure gradient is assumed hydrostatic over this interval, following the established logic (FIG. 1).
5. Between 9000 ft and 10,000 ft, porosity remains the same, but slight adjustment in lithology is needed. However, between 10,000 ft and 14,000 ft both porosity and lithology change, as indicated by the bold line B representative of a lithology-corrected velocity, due to the more rapid increase in observed velocity when compared to the reference velocity.

6. The abrupt decrease in observed velocity at 14,000 ft naturally leads to a prediction of high pore fluid pressure, and a prediction that is quite accurate, when compared with the RFT pressures. The method arrives at this prediction after attributing part of the decrease to a change in lithology and the remainder to pressure changes. The porosity is not permitted to increase.

While the present invention has been described and illustrated employing specific compaction and velocity relationships for sedimentary material, those skilled in the art will appreciate that modifications and changes can be made without departing from the scope of the invention as defined by the appended claims.

We claim:

1. A method of geophysical exploration to obtain estimates of the burial conditions for sedimentary materials at one location in a selected basin, comprising the steps of:
   (a) developing a reference model for an assumed set of burial conditions for sedimentary materials comprising a selected basin in the earth's subsurface;
   (b) forming a reference velocity profile based on these burial conditions representative of the variations in seismic velocities as a function of depth in the reference model;
   (c) obtaining an observed velocity profile from seismic data representative of the variations in seismic velocities as a function of depth for a specified location in the selected basin; and
   (d) obtaining estimates of the burial conditions of the sedimentary materials at the specified location in the selected basin by comparing the reference velocity profile to the observed velocity profile.

2. The method of claim 1 wherein the burial conditions are selected from the group including: lithology, pore fluid pressure, porosity, density and effective pressure.

3. The method of claim 1, further including:
   (a) obtaining an estimate of effective pressure $P_e(z_i)$ from the observed velocity profile; and
   (b) obtaining an estimate of porosity $\phi_e(z_i)$ from the estimate of the estimated effective pressure $P_e(z_i)$ and comparing the estimate of porosity $\phi_e(z_i)$ for the selected basin obtained for a selected depth $z_i$ with an estimate of porosity $\phi_e(z_{i-1})$ for the selected basin obtained from a shallower depth $z_{i-1}$ to obtain a revised estimate of effective pressure $P_e(z_i)$ for the sedimentary material comprising the selected basin.

4. The method of claim 3, further including constraining variations in the estimated porosity as a function of depth to be $\phi_e(z_i) \leq \phi_e(z_i - 1)$.

5. The method of claim 4 further including the step of obtaining a revised estimate of the effective pressure for the constrained porosity.

6. The method of claim 2 or 5 including the step of:
   (a) obtaining an estimate of pore fluid pressures from estimated effective pressure.

7. The method of claim 6, further including the steps of:
   (a) obtaining a pore fluid pressure gradient for the selected basin from the estimated pore fluid pressures;
   (b) representing the modeled basin's pore fluid pressure gradient as hydrostatic; and
   (c) comparing the pore fluid pressure gradient with the hydrostatic pore fluid pressure gradient of the modeled basin and obtaining a revised estimate of the effective pressure for the selected basin.

8. The method of claim 7 further including the step of constraining the pore fluid pressure gradient as a function of depth for the selected basin to be at least equal to the hydrostatic pore fluid pressure gradient for the reference modeled basin.

9. The method of claim 7, further including obtaining a revised estimate of the velocity from the revised estimate of effective pressure for the selected basin and comparing the revised estimate of the reference velocity with the observed velocity to obtain a revised estimate of formation lithology for the selected basin.

10. The method of claim 1, further including the steps of:
    (a) obtaining measures of selected in situ burial conditions at selected locations in the selected sedimentary basin; and
    (b) modifying the estimates of the burial conditions for the selected sedimentary basin employing the measures of in situ burial conditions.

11. The method of claim 1, further including constraining variations in estimated pore fluid pressure as a function of depth to be, at a minimum, hydrostatic over depth increments in which the observed velocity for the selected basin increases at a rate greater than the reference velocity for the modeled basin.

12. The method of claim 11, further including the steps of:
    (a) constraining variations in the estimated effective pressure and porosity for the selected basin over the interval to the reference values; and
    (b) obtaining a revised estimate of lithology for the selected basin consistent with constrained variations in the estimated effective pressure and porosity.

13. A method of geophysical exploration for obtaining estimates of the burial conditions for sedimentary materials comprising a basin, including the steps of:
    (a) developing a model of a selected basin for an assumed set of burial conditions;
    (b) forming a reference velocity profile for the modeled basin representative of variations in seismic velocities in the modeled basin as a function of depth;
    (c) obtaining an observed velocity profile for the selected basin representative of variations in seismic velocities in the selected basin as a function of depth; and
    (d) obtaining estimates of burial conditions for sedimentary materials comprising the selected basin by comparing the reference velocity profile to the observed velocity profile.

14. The method of claim 13, wherein the estimates of the burial conditions for sedimentary materials are selected from the group including: lithology, pore fluid pressure, effective pressure, density, and porosity.

15. The method of claim 13, wherein the step of developing a model for the selected basin includes representing the lithology of the selected basin with a reference lithology generally representative of the predominant lithology of the selected basin.

16. The method of claim 13, wherein the step of developing a model for the selected basin includes representing pore fluid pressure variations, as a function of depth, for the selected basin as being hydrostatic.

17. The method of claim 13, wherein the step of developing a model for the selected basin includes representing porosity variations, as a function of depth, for the selected basin with porosity measures obtained at a plurality of locations in the selected basin.

18. The method of claim 13, wherein the step of developing a reference velocity profile includes calculating the reference velocity profile according to:

$$V_r = V_1(1 - a_1 L - a_2 \phi + a_3 P)$$

where $V_1$, $a_1$, $a_2$ and $a_3$ are constants
L = lithology of the modeled basin,
$\phi$ = porosity, as a function of depth, of the modeled basin, and
P = effective pressure, as a function of depth, of the modeled basin.

19. The method of claim 18, wherein the porosity $\phi$, as a function of depth, of the modeled basin is represented by porosity measures obtained at a plurality of locations in the selected basin.

20. The method of claim 18, wherein the effective pressure P, as a function of depth, of the modeled basin is calculated according to:

$$P = P_t - P_p$$

where $P_t$ = overburden pressure, and
$P_p$ = pore fluid pressure, as a function of depth, of the modeled basin.

21. The method of claim 20, wherein the pore fluid pressure, as a function of depth, of the modeled basin is hydrostatic.

22. The method of claim 18, wherein the step of comparing the observed velocity profile $V_o$ with the reference velocity $V_r$ profile includes estimating the porosity $\phi$ and effective pressure for the selected basin by $V_o$ for $V_r$ in $$V_r = V(1 - a_1 L - a_2 \phi + a_3 P)$$

where $V_r \geq V_o$.

23. The method of claim 18, wherein the step of comparing the observed velocity profile $V_o$ with the reference velocity profile $V_r$, includes revising the estimate of lithology L in $$V_c = V(1 - a_1 L - a_2 \phi + a_3 P)$$

$$V_c = V_o$$

when $V_o > V_r$.

24. The method of claim 14, further including the steps of:
(a) comparing an estimate of porosity $\phi_e(z_i)$, at a first depth $z_i$, for the selected basin with an estimate of porosity $\phi_e(z_{i-1})$, at a shallower depth $z_{i-1}$, for the selected basin;
(b) constraining variations in the estimates of porosity, so as not to increase as a function of depth increases; and
(c) revising the estimate of effective pressure, as a function of depth, for the selected basin with the constrained estimates of porosity.

25. The method of claim 24, further including the steps of:
(a) constraining variations in the revised estimate of effective pressure $P_e$ to be at least $P_e = 0$ and
(b) obtaining a revised estimate of porosity, as a function of depth, for the selected basin with the constrained effective pressure $P_e = 0$.

26. The method of claim 14, further including the steps of:
(a) constraining estimates of pore fluid pressure gradients of the selected basin to be at least equal to a hydrostatic pressure gradient, $\Delta P_h$; and
(b) obtaining a revised estimate of porosity, as a function of depth, for the selected basin with the constrained pore fluid pressure $\Delta P_f = \Delta P_h$.

27. A method for estimating pore fluid pressure in the earth's subsurface, comprising the steps of:
(a) forming a model of the earth's subsurface for an assumed set of burial conditions;
(b) obtaining an estimated velocity profile for the model of the earth's subsurface;
(c) collecting a set of seismic data and obtaining therefrom an observed velocity profile of the earth's subsurface; and
(d) comparing the observed velocity profile with the estimated velocity profile and evaluating differences therebetween for obtaining estimates of pore fluid pressure in the earth's subsurface.

28. The method of claim 27, wherein the assumed set of burial conditions comprises:
(a) representing the earth's subsurface as being sedimentary material having a single lithology; and
(b) representing compaction of the sedimentary materials in the earth's subsurface as having occurred under conditions of hydrostatic pore fluid pressure.

29. The method of claim 27 further including the step of:
comparing the observed velocity profile with the estimated velocity profile and evaluating differences therebetween to obtain a measure of formation porosity.

30. The method of claim 27 further including the step of:
comparing the observed velocity profile with the estimated velocity profile and evaluating differences therebetween to obtain a measure of formation lithology.

* * * * *